United States Patent
Darbishire et al.

(10) Patent No.: US 6,840,558 B1
(45) Date of Patent: Jan. 11, 2005

(54) QUICK-INSTALLING, QUICK-RELEASING FRAME FOR PULL OUT DRAWER SYSTEM FOR PICKUP TRUCKS, OTHER VEHICLES AND TRAILERS, ETC.

(75) Inventors: R. Alan Darbishire, Powell, TN (US); O. Theodore Gibson, Knoxville, TN (US)

(73) Assignee: Durakon Acquisition Corp., Lapeer, MI (US)

( * ) Notice: Subject to any disclaimer, the term of this patent is extended or adjusted under 35 U.S.C. 154(b) by 0 days.

(21) Appl. No.: 10/139,618

(22) Filed: May 6, 2002

Related U.S. Application Data
(60) Provisional application No. 60/289,197, filed on May 7, 2001.

(51) Int. Cl.[7] .................................................. B60P 3/00
(52) U.S. Cl. ................... 296/26.09; 296/37.6; 414/522; 403/322.4; 248/503
(58) Field of Search ........................... 296/26.09, 26.08, 296/26.1, 37.6, 39.1, 39.2; 414/522; 403/321, 322.4; 248/503

(56) References Cited

U.S. PATENT DOCUMENTS
5,046,913 A  * 9/1991  Domek et al. .............. 414/522
6,328,364 B1   12/2001  Darbishire ............... 296/26.09

OTHER PUBLICATIONS
Darbishire et al., U.S. Provisional patent application No. 60/289,197 filed May 7, 2001 A.D.
Dover Resources Co., DE–STA–CO Clamps, Models 324, 334, 344, 374.
Trimark® 50–300 Single Rotor Latch.

* cited by examiner

*Primary Examiner*—Joseph D. Pape
(74) *Attorney, Agent, or Firm*—Christopher John Rudy (57) ABSTRACT

Quick-installing and quick-releasing pull out cargo-carrying frame includes a stationary frame to which is attached a first component of a quick-stall, quick-release attachment member, which can be employed to secure the frame to a cargo or other mounting area of a vehicle, trailer or other suitable mounting member through a second component of the quick-install, quick-release attachment member corresponding to the first component. The frame can be accompanied by a tray or other cargo-supporting member.

18 Claims, 13 Drawing Sheets

QUICK-INSTALLING, QUICK-RELEASING FRAME FOR PULL OUT DRAWER SYSTEM FOR PICKUP TRUCKS, OTHER VEHICLES AND TRAILERS, ETC.

This claims benefit under 35 USC 119(e) of U.S. provisional patent application No. 60/289,197 filed on May 7, 2001 A.D. The complete specification of that application is incorporated herein by reference.

BACKGROUND TO THE INVENTION

I. Field and Purview

The present invention concerns a frame with or without an accompanying pull out drawer system, useful, for example, with pickup trucks, other vehicles such as cargo vans, sport utility vehicles and so forth, and trailers, as well as in cabinetry, shelving and so forth, which includes at least one quick to install and release member or part for attaching and detaching the frame or frame with pull out drawer system to the pickup, other vehicle, trailer, or other suitable mounting member. In particular embodiments, the quick-install, quick-release frame subsystem can be attached to the vehicle or trailer cargo bed through any of a number of latch and catch mechanism types, as well as through other types of mechanisms. For example, rotary latch(s) and/or over center toggle clamp(s) may be affixed to a stationary frame cross-member of a pull out drawer system, with corresponding catch(es) or striker(s), or latch-plate(s), mounted in or to the cargo bed to receive the same.

II. Art with Problems

Various extendible drawer or tray devices are known for easing the burden of loading and unloading cargo. See, e.g., Darbishire, U.S. application Ser. No. 09/506,057 filed Feb. 17, 2000, U.S. Pat. No. 6,328,364 (Dec. 11, 2001). As useful as such devices are for their intended purpose, especially the devices of the '057 application, installation of the same usually requires drilling and screwing, or welding or modification of the cargo bed of the pickup truck. Although the known installation procedures can be relatively simple for the skilled home or professional mechanic, they do take time, and may undesirably invade the integrity of the pickup truck or other vehicle cargo bed as it may come from the factory or showroom. As well, removal of the cargo-carrying device is more than occasionally desired, for example, to transport a load of topsoil or decorative stones, but if so desired or possible, involves reversing the process of installation and could involve removal of rusty nuts and bolts, which is itself an unpleasant task, leaving exposed holes in the bed of the pickup truck. Such a removal process, too, can take up a significant amount of time. Of course, after the specified task is complete, there is again faced the job of reinstalling the extendible drawer device.

It would be desirable to simplify and speed up installation of extendible drawer or tray devices. It would be desirable also to provide for a simplified and speedy removal of the extendible drawer or tray devices. As well, it would be desirable to make it possible to easily and quickly install, remove, reinstall and so on, the extendible drawer or tray devices. It would be further desirable to be able to provide such with a minimum of invasion of the cargo bed or other suitable mounting member.

SUMMARY OF THE INVENTION

The present invention provides a quick-installing and quick-releasing pull out cargo-carrying frame comprising a stationary frame to which is attached a first component of a quick-install, quick-release attachment member, which can be employed to secure the frame to a cargo or other mounting area of a vehicle, trailer or other suitable mounting member through a second component of the quick-install, quick-release attachment member corresponding to said first component. The frame can be accompanied by a tray or other cargo-supporting member attached thereto. Consequently provided are the vehicle, trailer or another artifice having a suitable mounting member, to or in which is mounted said second component; as well as a combination of said frame, or frame with tray or other cargo-supporting member, attached to the vehicle, trailer or said other artifice through said first and second components.

The invention is useful in cargo and other goods management.

Significantly, by the invention, installation of a stationary frame for, or typically as the ultimate goal, installation of an extendible drawer or tray device in which the frame is a part, is not only dramatically simplified but also dramatically speeded up. The operator can install, remove, reinstall, again remove, and again reinstall the frame system, as desired. Each time, the installation remains assured, and the integrity of the cargo bed or other mounting member having the second component of the quick-installing and quick-releasing system remains substantially intact. The invention not only is well adapted for use in cargo areas of vehicles or trailers, especially, for example, pickup trucks, but further may be adapted for use in such applications as cabinetry, shelving, and so forth.

Numerous further advantages attend the invention.

DRAWINGS ASSISTING IN ILLUSTRATING THE INVENTION

The drawings form part of the specification hereof. With respect to the drawings, which are not necessarily drawn to scale, the following is briefly noted.

DETAIL ADDITIONALLY ILLUSTRATIVE OF THE INVENTION

The invention can be further understood by the present detail which may be read in view of the drawings. Such is to be read in an illustrative and not necessarily limiting sense.

The complete specification of Darbishire U.S. Pat. No. 6,328,364 is incorporated herein by reference.

In general, quick-installing and quick-releasing pull out cargo-carrying frame includes a stationary frame to which is attached a first component of a quick-install, quick-release attachment member. The quick-install, quick-release attachment member can be employed to secure the frame to a cargo or other mounting area of a vehicle, trailer or other suitable mounting member, and this is accomplished through a second component of the quick-install, quick-release attachment member corresponding to the first component. The frame can be accompanied by a tray or other cargo-supporting member attached thereto. To or in the vehicle, trailer or other artifice having a suitable mounting member, is mounted the second component. A combination of the quick-installing and quick-releasing pull out cargo-carrying frame, or frame with tray or other cargo-supporting member, attached to the vehicle, trailer or said other artifice through such first and second components is also part of the invention. In particular embodiments, the quick-install, quick-release frame subsystem can be attached to the vehicle or trailer cargo bed through any of a number of latch and catch mechanism types, as well as through other types of mechanisms. As illustrations, rotary latch(es) and/or over-center toggle clamp(s) may be affixed to a stationary frame cross-member of a pull out drawer system, with corresponding catch(es) or striker(s), or latch-plate(s), mounted in or to a pickup truck cargo bed to receive the same.

With respect to the drawings, easy to install, pull out or extendible, cargo-carrying drawer or tray device 1000 is depicted as being mounted on bed 9 of a pickup truck having a cargo area 10 defined in part by the bed 9; side walls 11, each of which may have a wall overhang; front or cab end wall 12; and tailgate 13. In general, stationary frame 100, which is shown as mounted in the cargo area, is in extendible, sliding and/or rolling attachment with movable frame 200. Attached to the frame 200 can be tray or drawer 300 or other type of cargo-supporting member such as a flat board and so forth, on which cargo may be placed.

Figure 1:
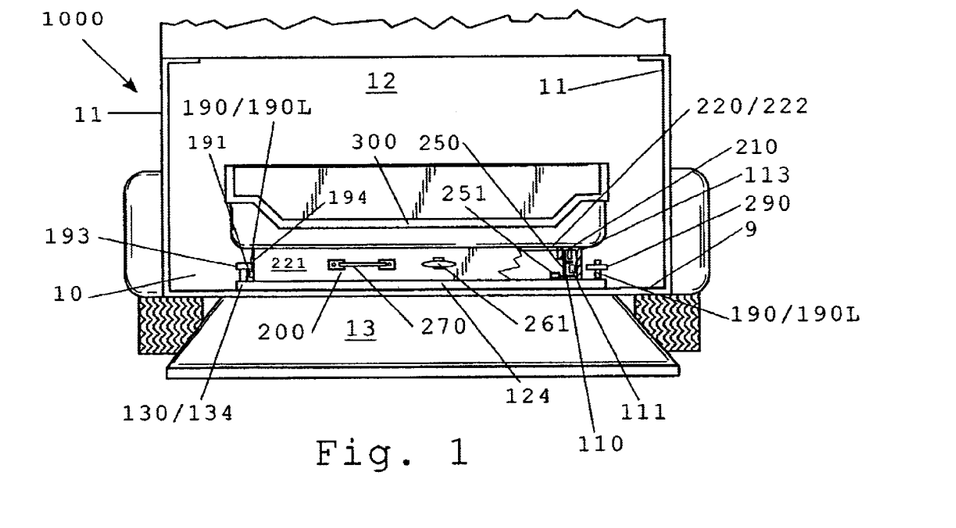
FIG. 1 is a rear plan view, in partial section, of an embodiment of a quick-installing and quick-releasing pull out cargo-carrying frame and extendible drawer tray device of the invention, mounted to the cargo bed of a pickup truck.

Beneficially, the interacting frames 100, 200 are foundationally such as disclosed in the referenced Darbishire patent, thus, say, with the frame 100 including a pair of parallel, longitudinally directed side rails 110 with inwardly facing roller tracks 111. Roller stopping block(s) 112 may be provided at the superficial or "tailgate" (rear) end of the rail 110 to help keep the rolling frame 200 from becoming separated from the base frame 100 during extension. Mounted generally above the roller track 111 are sets of spinnable bearings (upper, tray-supporting rollers) 113, say, of steel. Preferably, the rail 110 is in the form of an inverted F-channel which has above the lower roller track 111 a vertically extending face and an upper roller track defined by a central horizontally extending portion and a lower horizontally extending portion, to and in which upper vertically extending face the rollers 113 are mounted and spin. A suitable number of the upper rollers 113 are provided, beneficially, for example, four, in sets of two each mounted near the rear end of the rail 110 upper vertical inner face, say, at about a 16-inch or so distance apart in prepositioned mounting holes such as with one upper roller 113 mounted an inch or so from the rear end of the rail 110, and the other roller 113 mounted seventeen inches or so from the rear end of the rail 110. The roller tracks 111 can accommodate drawer frame rollers 250, say, of steel. A suitable number of cross-members 120, say, three to five, are secured to the rails 110 to hold them in place, generally with more cross-members 120 in the longer systems, and the cross-members 120 can take various forms and have various dimensions. For example, cross-member 121 can be L-shaped and be for mounting at the front or "deep" or cab end of the frame 100; cross-member can be 122 next, followed by cross-members 123 & 124, the latter to be mounted at the front or "superficial" or tailgate end of the frame 100; the cross-members 122, 123, 124 may have an inverted U-shaped cross-section, for example, or, say, have a rectangular cross-section, and so forth. Optional mounting holes 125 may be provided inside the rails 110 in the cross-members 120. Resilient, shock-absorbing pads 126 may be provided on rearward facing surfaces of the L-shaped cross-member 121 so as to cushion the impact of the frames 100, 200 when the system is fully closed, and/or resilient, shock-absorbing pads 127 may be provided on the frontward facing surface of the stop block 112 so as to cushion the impact of the frames 100, 200 when the system 1000 is fully opened. The pads 126, 127 can be made of a rubber, rubbery synthetic plastic, cork, or the like. The rails 110 can be mounted to the cross-members 120 by any suitable means such as screwing, riveting, gluing, and so forth; an excellent way to to mount the rails 110 to the cross-members 120, however, is through metal to metal welds 128. As a further alternative, the rail and cross-member assembly 110/120 may be made monolithically. Base mounting tabs 130 external to the rail 110 may be provided, say, as by extensions of cross-members 120. The tabs 130 may have optional outside mounting holes 131 formed therein in addition to or in lieu of any inside mounting holes 125. An advantageous feature of the frame 110 is that it can be "ramped" so that, in general, the deep (front or "cab") end of the frame is mounted closer to the suitable mounting surface (pickup truck, van, trailer bed, etc.) than is the superficial (rear or "tailgate") end. This ramping can be accomplished, for an example, by having successively thicker cross-members 120 supporting the rails 110, for example, providing the cross-member 121 with a ¼-inch thickness, the cross-member 122 with a ⅜-inch thickness, the cross-member 123 with a ½-inch thickness, and the cross-member 124 with a ⅝-inch thickness. The ramp gradient can keep the drawer frame from hitting certain tailgates of certain model pickup trucks, for example; can bias a drawer frame and tray assembly 200, 300 toward the closed position and assist in closing; and may help keep spills in the tray 300 until a suitable grade is found to drain them. Inside roller bearing mounting holes may be provided in a cross-member 120, for example, in one nearest the superficial (rear or "tailgate") end such as the cross-member 124, so that a pair inside roller bearing wheels 151, of steel, may be mounted thereby to guide the drawer frame 200, which itself may swing slightly from side to side, and reduce friction when opening and closing the drawer frame assembly 200, 300 rollingly attached-to the stationary frame 100. In general, the rollers 113, 151 & 250 are provided with suitable tolerances so as to permit proper rolling action during extension and retraction of the frames 100, 200. Locking pin-engaging ramps 163 may be provided on the inner face 114 of the rail between the wheels 113 and front end of the rail 110, in opposing sets, front set 163F near the front (deep or "cab") end of the rail with the widest part of the wedge closest to the front of the rail 110, and rear set 163R in front of the set of wheels 113 with the widest part of the wedge closest to the rear of the rail 110. Middle set 163M may also be provided; however, when it is, care should be taken to keep the locking system disengaged when it passes by the ramps 163M if it is desired to not stop there. In general, front and rear locking pin-engaging ramps 163F, 163R alone are often provided. These ramps 163, which may be of any suitable material and may have a hardened face, can be employed in lieu of holes, the holes being a viable alternative, for engaging spring-loaded, sliding pin of a corresponding locking system with retractable pins or pegs on the front part of movable frame 200 and may be attached, say, by riveting, welding, or in any other suitable manner. Riveting of the ramps 163 is beneficially provided as the rivets are easily installed at the factory, and, should a ramp 163 become disengaged, the home-repairman may fix this with a nut and bolt. Alternatively, the ramps 163 may be provided by being formed monolithically with the rail 110. The movable drawer frame 200 thus includes inverted J-shaped side rails 210 and cross-members 220, which are suitably attached, say, welded together. Alternatively, the frame 200 including the rails 210 and the cross-members 220, may be constructed by screwing its component parts together, riveting, gluing, and so forth, or may provided by being formed monolithically. A suitable number, say, from three to seven, cross-members 220 are employed, generally with more cross-members 220 in the longer systems; for example, there may be provided five cross-members 220: one a rear-facing cross-member 221, which may generally have a rotated-L (or gamma) cross section, and four remaining cross-members 222, which may generally have an inverted-U shape. With respect to the inverted J-shaped side rails 210, each rail 210 can have a depending, wheel-mounting portion; depending, a rail-aligning portion which is typically shorter than the depending, wheel-mounting portion; and an upper, tray-mounting and supporting portion, which is generally non-depending but co-planar with the tray 300, and typically against and under which upper, tray-mounting and supporting portion the upper set of rollers 113 mounted on the inner face of the side rail 110 of the stationary frame 110 rollingly engage so as to directly support the upper, tray-mounting and supporting portion as well as the tray 300. To the side rails 210 are attached a number of the roller bearing wheels 250, again say, of steel, mounted for tracking in the roller tracks 111 of the base frame rails 110. For example, four rollers 250 may be so mounted, one set of two by each of the two front corners of the side rails 210. The inverted J-shaped side rails 210 engage appropriately with the base frame side rails 110, and act otherwise much like a cabinet drawer set up. However, when the frames 100, 200 are closed in the system, the weight in the tray 300 is supported in an upward fashion by the rollers 113 while the rollers 250 support the tray upwardly by having their weight borne in the lower horizontally extending portion 117 defining the channel 111; when the system is extended, the weight in the tray is supported in an upward fashion by the rollers 113 while pressure from the upper portion of the rollers 250 in the central horizontally extending portion 116 defining the channel 111 is applied to support the extended load, in a quasi-lever action. Stops are typically provided in the moving frame side rails 210, say, one per rail, to engage the stop blocks 112 and keep the movable frame 200 from being pulled away from the stationary frame 100 when the frame 200 is extended. The stops can be of any suitable material, say, steel, and mounted in any suitable manner, say, by screwing into the rails 210; alternatively, the stops may have a resilient, shock-absorbing coating in lieu of or addition to the resilient, shock-absorbing pads 127, and be employed for the same purpose. Drawer locking subsystem can keep the drawer frame and tray assembly 100, 200, 300 in locked position, and can be unlocked for extension of the tray for loading or unloading. Rearward facing knob 261 attached to communicating link such as a cable, chain, rod or the like may be pulled to pull and activate to open the locking arrangement, which can be of the spring-loaded, sliding pin or peg type, the same engaging and sliding up the front or rear ramp 163F/163R to drop off after it passes the widest part of the wedge 163 to secure it in locked position. Pulling the handle 261 releases the pin by pulling it in so that it may pass the wedge 163 for free movement until it again rides up a wedge 163 and locks. Preferably, the link is a cable which has a split therein so that a plurality, say, a pair, of locking arrangements which are provided are simultaneously activated. The cable may be threaded through holes in the cross-members 220. The locking subsystem is simple and effective in all types of typically encountered environments to include under dirty as well as not conditions. When the drawer is closed, the peg again with its spring or other means biased adaptation enters the corresponding peg-mating space beyond the wedge 163 or a hole to lock the drawer in its closed position so that it cannot be extended accidentally. Other locking features may be employed to include use of switch activated solenoid locks and so forth and the like. Pull out handle 270 is generally provided, and the handle 270 may be separate, of the loop variety, and placed alongside the knob 261 for good control of movement during extension and retraction, particularly when heavily loaded. The stationary and movable frame assembly 100, 200 may have its inverted F-channel and inverted J-channel sets arranged in a 180-degree relationship to that illustrated in FIG. 1. Compare, the specification drawings from the incorporated '364 patent.

Building upon such a foundation, or in another type of stationary frame suitable for the purpose, for the device 1000, first component 190 of quick-install, quick-release attachment member mounts to the stationary frame 100 for extendible drawer type device, typically on frame cross-member 120, and second component 290 of the quick-install, quick-release attachment member, to which the first component 190 fastens, mounts to the suitable mounting member such as the cargo bed 9 of a suitable motor vehicle, for example, a pickup truck bed or a van floor compartment, a trailer deck, a counter, a shelf, and so forth and the like. Desirably, the suitable mounting member is in or on a motor vehicle or trailer. Alternatively in the practice of the invention, a first component of a quick-install, quick-release attachment member may be mounted to the suitable mounting member, and a second component of quick-install, quick-release attachment member may be mounted to the stationary frame.

Figure 2:
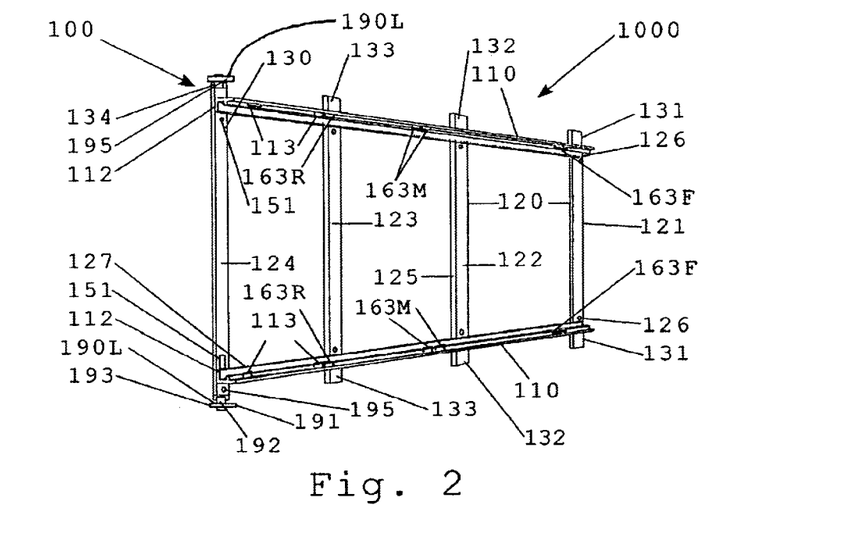
FIG. 2 is a top view, slightly from the rear, of the stationary frame itself, also showing an embodiment, in general, of first components of a quick-install, quick-release attachment member which are employed to secure the frame to the bed of the pickup, as generally found within FIG. 1.
Figure 11:
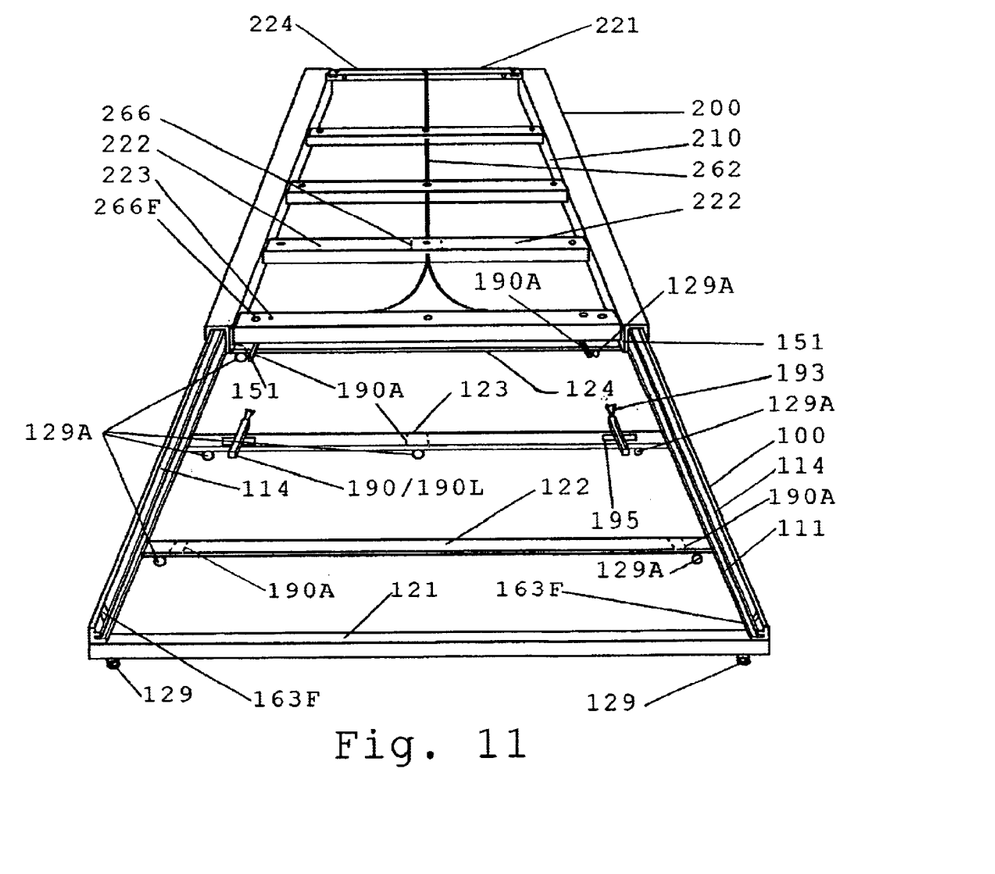
FIG. 11 is a front, top, perspective view of another embodiment of a stationary frame and movable frame subassembly of the invention, showing components at alternate locations.
Figure 12:
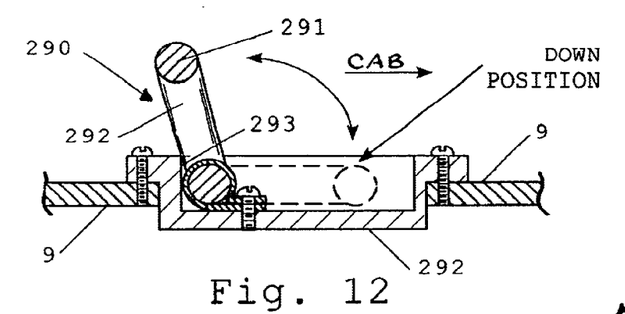
FIG. 12 is a side, sectional view showing another embodiment of a second component, e.g., another flip up, stow away striker part, of the invention.
Figure 13:
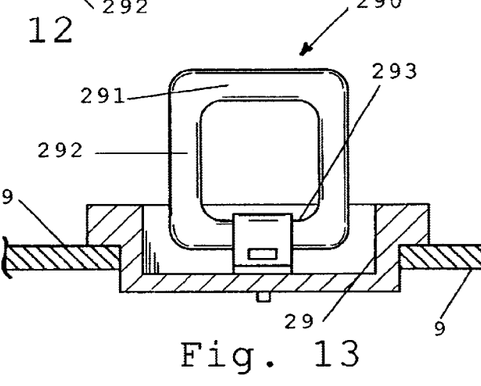
FIG. 13 is a front view of the component shown in FIG. 12.

The first component 190 may be mounted at any suitable location on the stationary frame 100, for example, on tabs 130 to the outside of parallel tracks or channels 110 of the frame 100 (FIGS. 1, 2 and 46) or to the inside of the tracks 110, say, in tandem on cross member 123 (FIG. 11). As well, the first component may be mounted at alternative position 190A inside the channels 110 on the cross-member 120, for example, in tandem on cross-member(s) 122 and/or 124 and/or singly, say, about the mid-point of of the cross-member 123 (FIG. 11) and so forth, or at other particular positions (not illustrated) inside or outside the the tracks 110. On, in or under the suitable mounting member such as, for purposes of illustration, the bed 9 of a pickup, in location(s) that would correspond to at least one, and preferably more than one, of the position(s) at which the first component 190 is mounted, is(are) provided the second component 290 for mating, fastening engagement with the first component so as to provide for mounting of the stationary frame 100 to the suitable mounting member 9. In turn, of course, the movable frame 200 or movable frame 200 with load-carrying member 300, for example, tray, is(are) mounted to the stationary frame, and this may occur before or after the fastening engagement of the first and second components 190, 290.

In conjunction with a provision of movable first component(s) 190 such as alluded to above, immovable components(s) that may be considered to be auxiliary first component(s) may be provided. These, for example, may take the form of hook(s) 129 attached to the stationary frame 100, for example, at or by a cross-member 120 such as outside the parallel channels 110 under cross-member 121

Figures 3, 4, 5, 6:
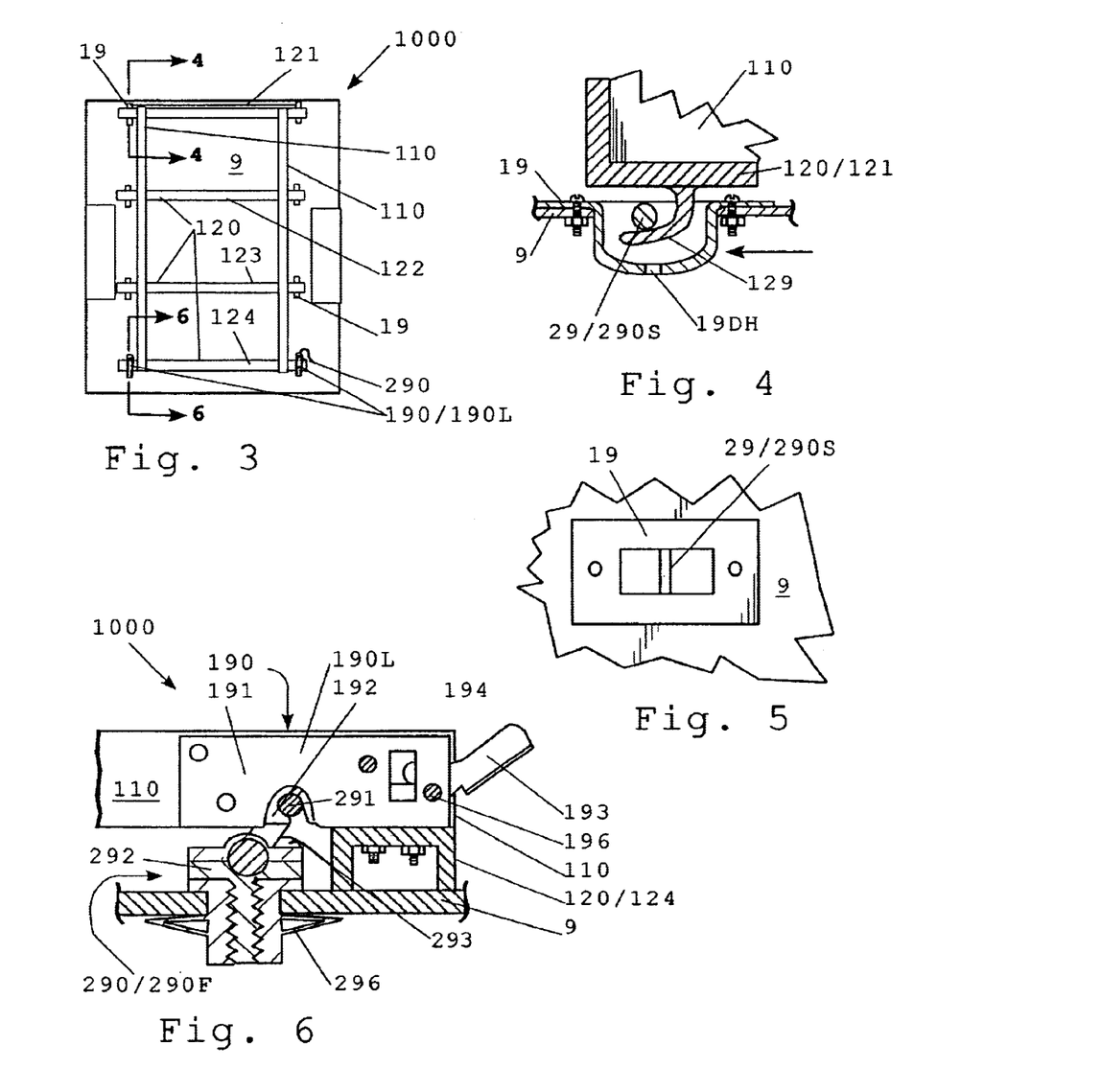
FIG. 3 is a top view of the stationary frame of FIG. 2, in combination with and mounted to the bed of the pickup.
FIG. 4 is a sectional view of part of the system depicted in FIG. 3, taken along 4—4.
FIG. 5 is a top plan view of a frame attachment receptacle mounted to the bed as generally depicted in FIG. 3. Compare, FIG. 20D from the aforesaid patent to Darbishire, U.S. Pat. No. 6,328,364 B1.
FIG. 6 is a sectional view of part of the system depicted in FIG. 3, taken along 6—6, i.e., a left side view in section to include of first and second components of that embodiment.

(FIG. 3) or cross-member 123 (FIG. 46) outside the parallel channels 110 and/or as well at one or more alternative positions 129A such as under cross-member(s) 122 and/or 123 which may be inside the channels 110 (FIG. 11) or elsewhere (not illustrated). In mounting, the hooks 129 are made to enter cup or receptacle 19, which has stationary frame engaging member 29, for example, in the form of a horizontal post, and go under and engage the member 29, preferably with the hooks being mounted so as to open toward the "front" (say, cab) end 12 of the cargo bed area 10. See, FIGS. 3–5, 47 and 48.

Figures 7, 8, 9:
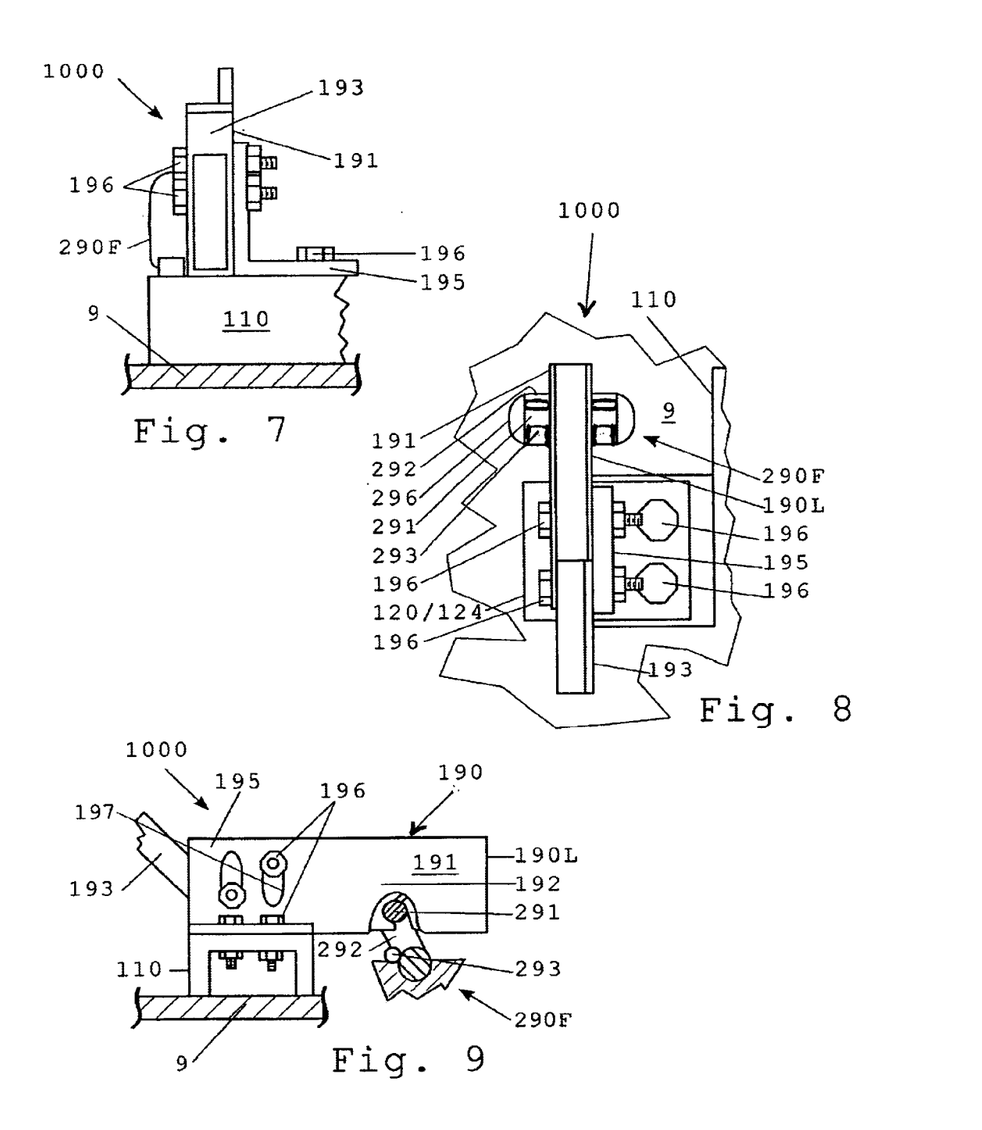
FIG. 7 is a rear view of the system part shown in FIG. 6.
FIG. 8 is a top view of the system part shown in FIG. 6.
FIG. 9 is a right side view of the system part from FIG. 6.

In general, the first component 190 may include one or more of the following parts or features: housing 191 or other mount; latch 192 or other suitable fastening contrivance; release handle 193; mounting holes 194, say, in a part of the component 190 that may be considered to be a mount such as mounting bracket 195, in which fasteners 196 such as screws, bolts and nuts (illustrated) or rivets, pins, staples, or other contrivances (not illustrated) are placed to mount the first component 190 to a suitable part of the frame 100. Slots 197 may be provided in a mount or mounting bracket 195 to provide for adjustability of height (FIG. 9) so that the first component 190 may be made adaptable, say, for engaging a second component 290 mounted to the bed 9 of a pickup truck in cases in which a bed liner is not present (illustrated) or in which a bed liner (which may have a ¾-inch thickness or any other thickness in general) is present (not illustrated).

Figure 18:
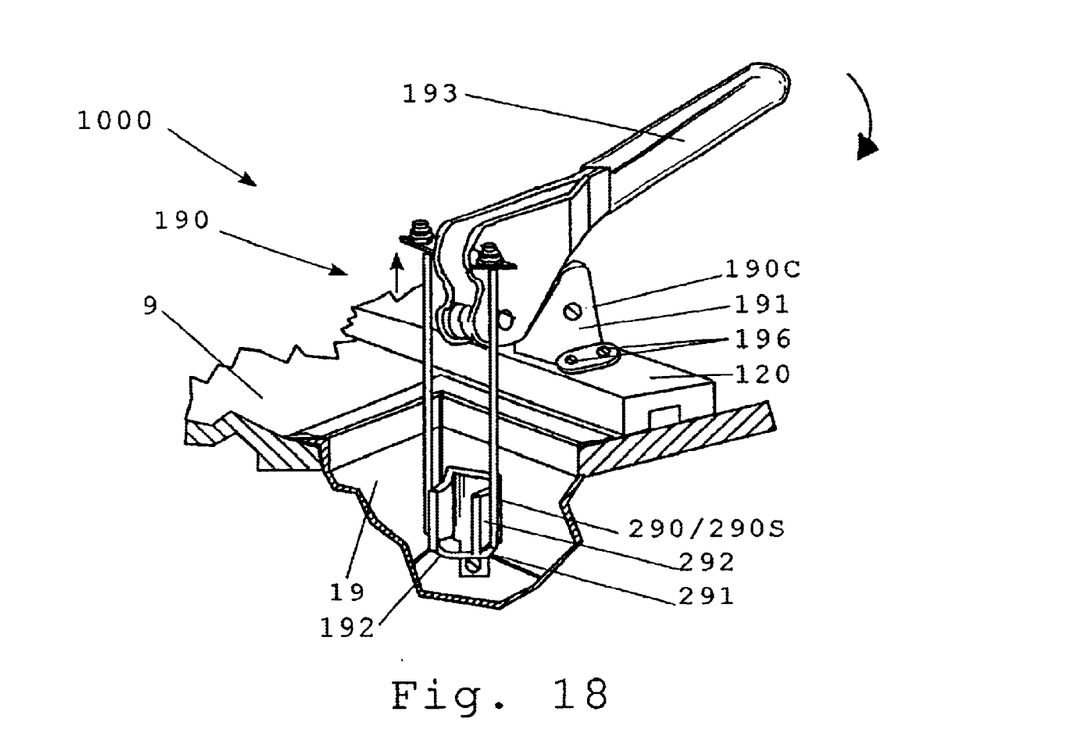
FIG. 18 is a perspective view of another embodiment of a quick-installing and quick-releasing pull out cargo-carrying frame and extendible drawer tray device of the invention, i.e., with a clamp-type attachment, mounted to a vehicle's cargo bed.
Figures 19, 20, 21, 22, 23:
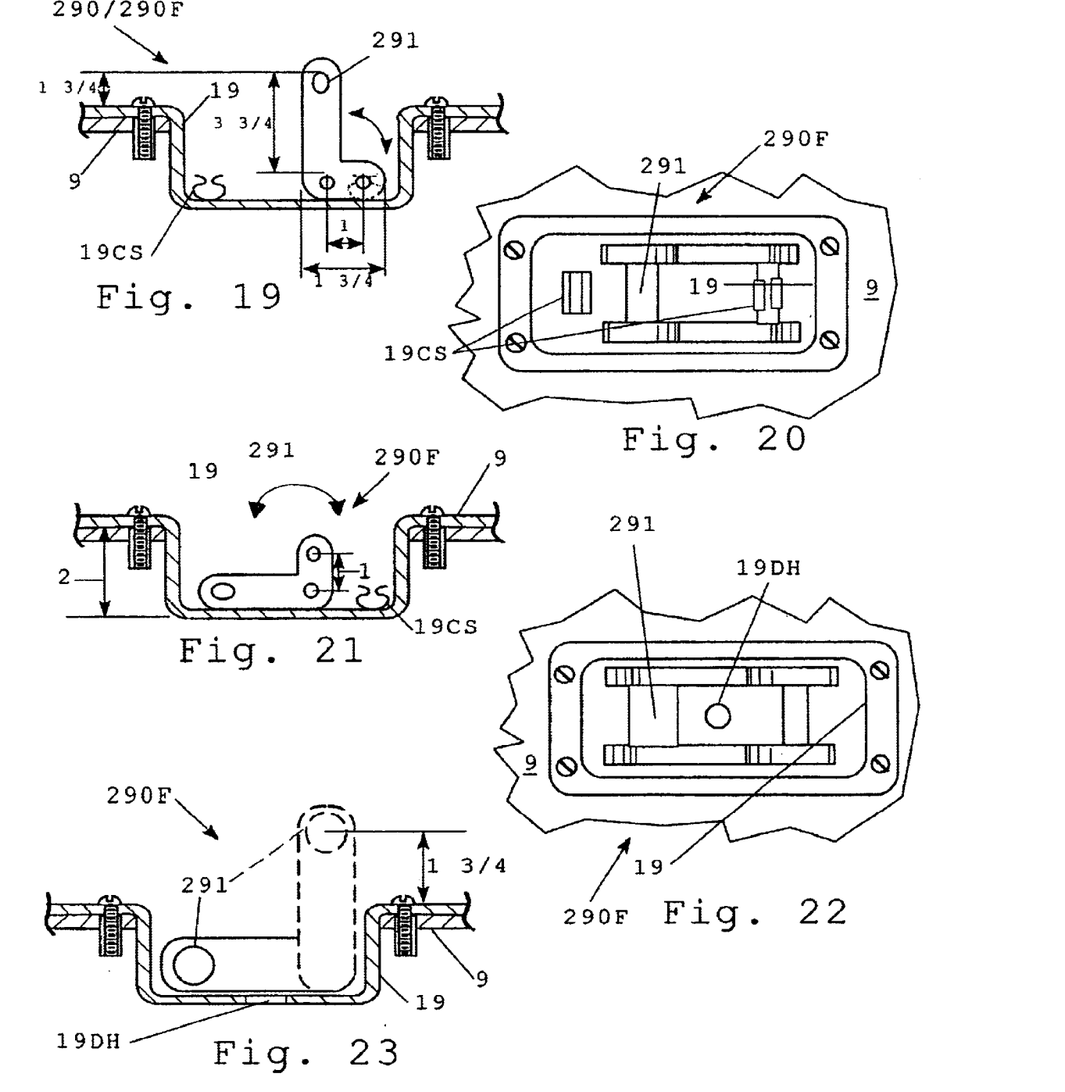
FIG. 19 is a side, sectional view showing another embodiment of a second component, e.g., another flip up, stow away striker part, of the invention, mounted in a cargo bed of a vehicle, and in a flip up position, ready for attachment to a first component.
FIG. 20 is a top view of the second component of FIG. 19.
FIG. 21 is a side, sectional view of the second component of FIG. 19, in its stow away position.
FIG. 22 is a top view of another embodiment of a second component, e.g., another flip up, stow away striker part, of the invention, mounted in the cargo bed of a vehicle.
FIG. 23 is a side, sectional view of the second component of FIG. 22.
Figures 24, 25, 26:
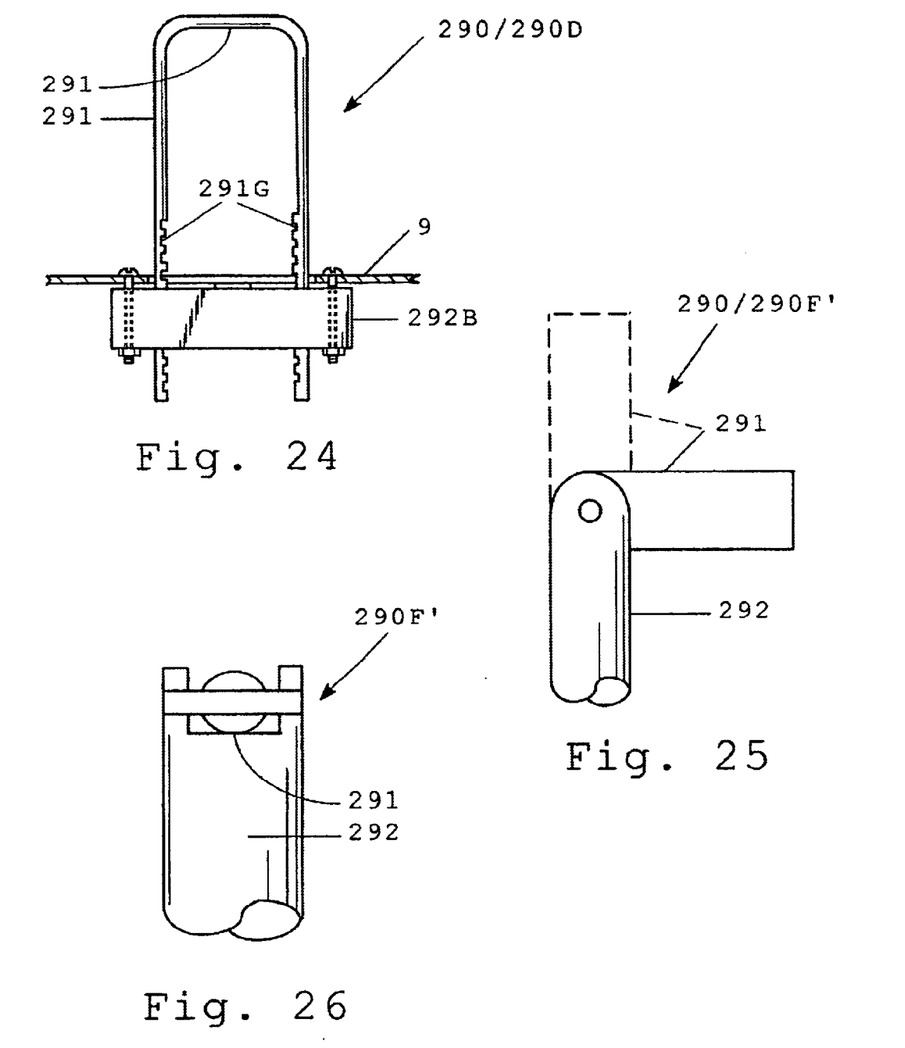
FIG. 24 is side, partial sectional view of another second component of the invention, e.g., a "bicycle lock" type having a plurality of variable positions at which to set the striker position, mounted to the cargo bed of a vehicle.
FIG. 25 is a front plan view of another second component of the invention, e.g., a folding striker type, which advantageously takes a smaller hole when mounted to the cargo bed of a vehicle.
FIG. 26 is a side view of the second component of FIG. 25.
Figure 27:
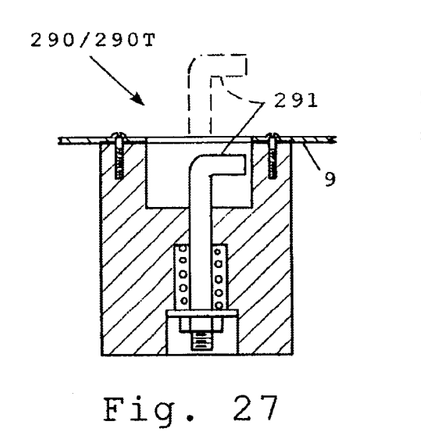
FIG. 27 is a front, partial sectional view of another second component of the invention, e.g., a pop up striker type, say, for a rotary latch, with a J-bolt type striker-mounting member.
Figure 28:
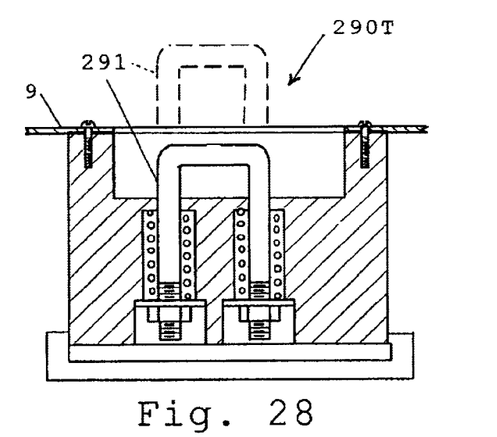
FIG. 28 is a front, partial sectional view of another second component of the invention, e.g., a pop up striker type, say, for a rotary latch, with a U-bolt type striker-mounting member.
Figures 29, 30, 31:
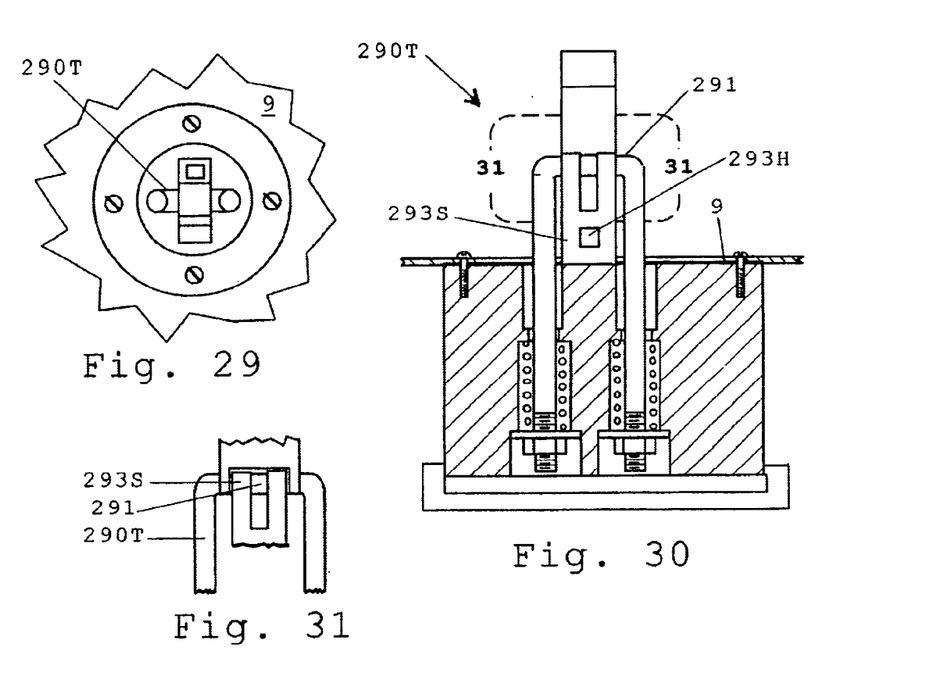
FIG. 29 is a top view of the second component of FIG. 28.
FIG. 30 is a front, partial sectional view of another second component of the invention, e.g., a pop up striker type, say, for a rotary latch, with a supported U-bolt type striker-mounting member, which can advantageously be pulled up from its storage position rather easily through the support member for the U-bolt.
FIG. 31 is a detailed view of bail-containing part of the component of FIG. 30, taken from within circle 31.
Figures 32, 33, 34, 35, 36, 37:
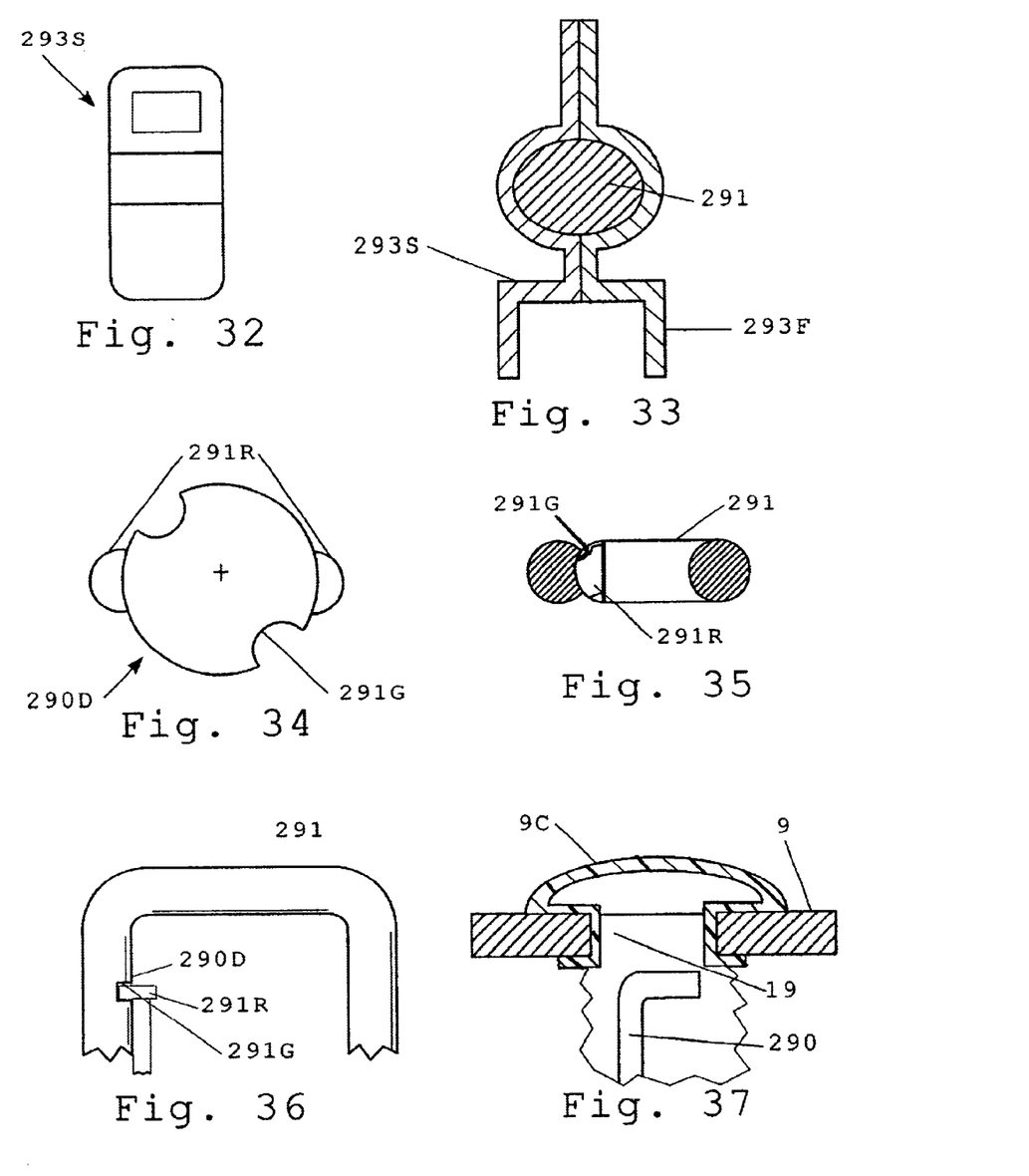
FIG. 32 is a plan view of the bail seen within FIG. 30.
FIG. 33 is a side, sectional view of the detail from FIG. 31.
FIG. 34 is a top view of an alternate locking device to a bail such as otherwise may be found within FIGS. 30–33.
FIG. 35 is a bottom sectional view of a locking disc part of the device of FIG. 34.
FIG. 36 is a side view of the device seen in FIGS. 34 and 35.
FIG. 37 is a side, sectional view of a cap plug or cover for a mounting cup or hole in a cargo bed of a vehicle, which may be employed in the practice of the invention.
Figure 38:
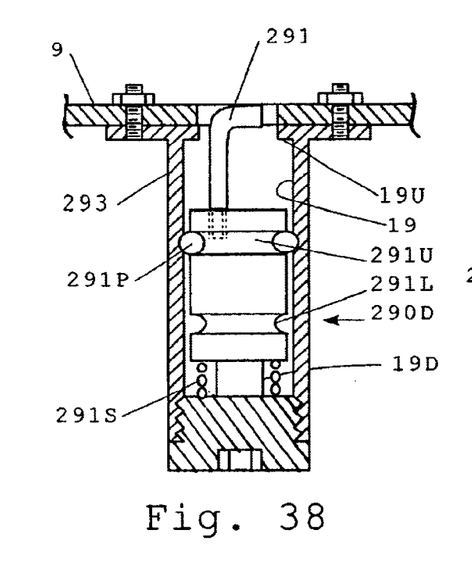
FIG. 38 is a side, sectional view of another embodiment of a second component of the invention, e.g., another pop up striker type, which employs a spring-biased mount and multi-position sliding-pin striker-position stop, the component being depicted in its "down" position.
Figure 39:
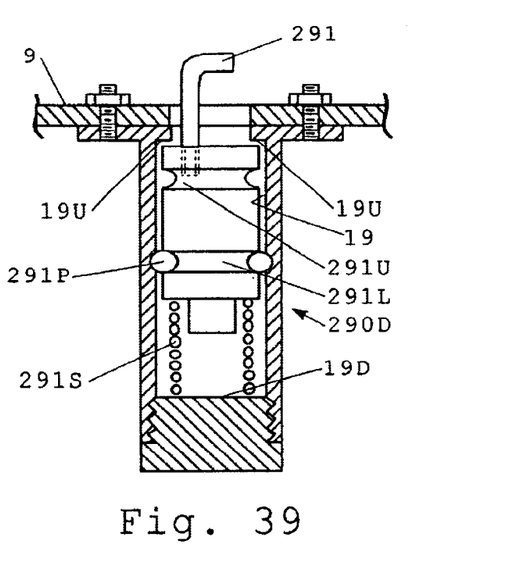
FIG. 39 is a side, sectional view of the component of FIG. 38 in its "up" position.
Figures 40, 41:
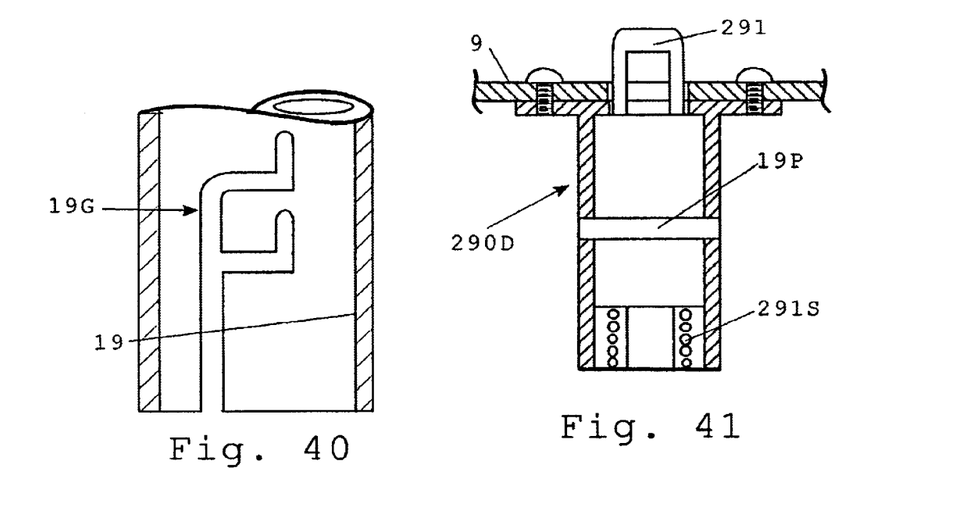
FIG. 40 is a side, sectional view of a grooved mounting cup as part of another second component embodiment of the invention.
FIG. 41 is a side, sectional view of a second component embodiment of the invention employing the part of FIG. 40.
Figure 43:
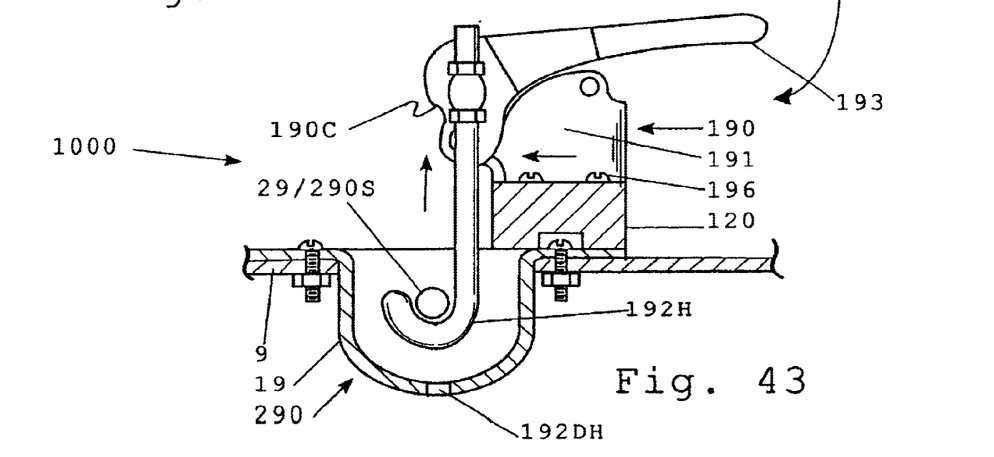
FIG. 43 is a side, sectional view of another embodiment of the invention, a quick-installing and quick-releasing pull out cargo-carrying stationary frame for mounting with a corresponding movable frame and an extendible drawer tray device, mounted to the cargo bed of a vehicle. The same has a clamp-type attachment otherwise such as depicted in FIG. 18 but with a depending hook to clamp to a cross-bar of a receptacle mounted to the bed.
Figures 44, 45, 46, 47:
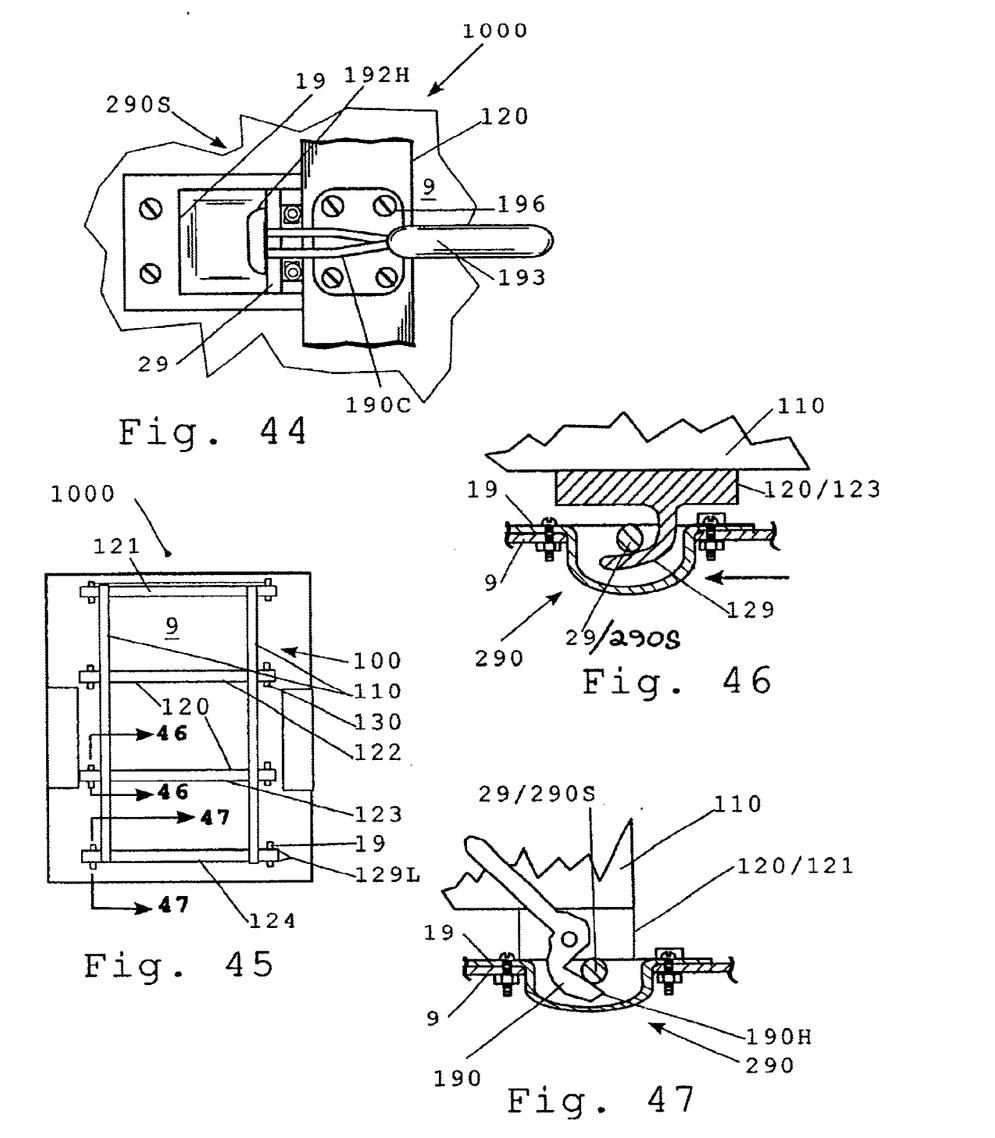
FIG. 44 is a top view of the embodiment of FIG. 43.
FIG. 45 is a top plan view of an embodiment from the patent to Darbishire (U.S. Pat. No. 6,328,364 B1, FIG. 20A), showing a modified frame to bed attachment system. Note also, the present FIG. 5 top plan view detail of a frame attachment receptacle employable herewith.
FIG. 46 is a sectional view of part of the system depicted in FIG. 45 ('364 patent, FIG. 20B), taken along 46—46.
FIG. 47 is a sectional view of part of the system depicted in FIG. 45 ('364 patent, FIG. 20C), taken along 47—47.

In a particular embodiment, the movable first component 190 may take the form of an actuatable latch, for example, a single rotor latch such as commercially available from the Trimark (Reg. ™) organization of New Hampton, Iowa, as model number 50–300. See, FIGS. 1, 2 and 6–9. In other particular embodiments, the movable first component 190 may take the form of a clamp, for example, an over-center toggle locking action pull-action manual clamp such as a DE-STA-CO Model-324 clamp available from Dover Resources Co. In the cases of the pull-action manual clamps, the suitable fastening contrivance 192 itself may be the bottom part of a loop, which may be considered to be a catch (FIG. 18) or the clamp may be modified so that its part of a fastening contrivance is in the form of a hook 192H (FIGS. 43 and 44).

Figure 10:
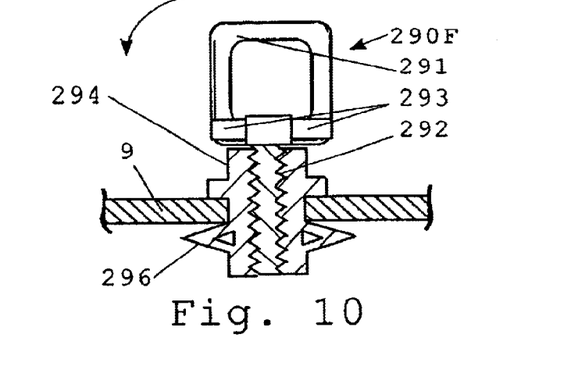
FIG. 10 is a rear view of a second component, e.g., a striker part, depicted within FIGS. 3 and 6–10.
Figure 14:
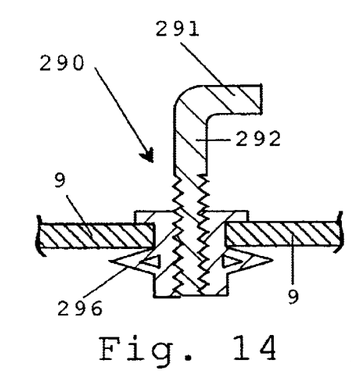
FIG. 14 is a side, sectional view showing another embodiment of a second component, e.g., a screw-type striker part, of the invention, mounted in a cargo bed of a vehicle.
Figure 15:
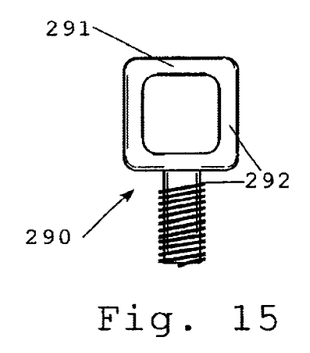
FIG. 15 is a front view of another embodiment of a second component, e.g., another screw-type striker part, which may be employed in the invention.
Figure 16:
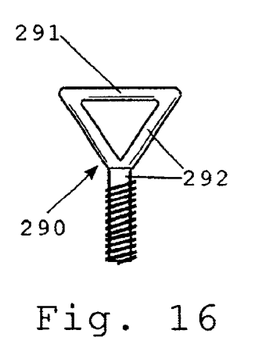
FIG. 16 is a front view of another embodiment of a second component, e.g., another screw-type striker part, which may be employed in the invention.
Figure 17:
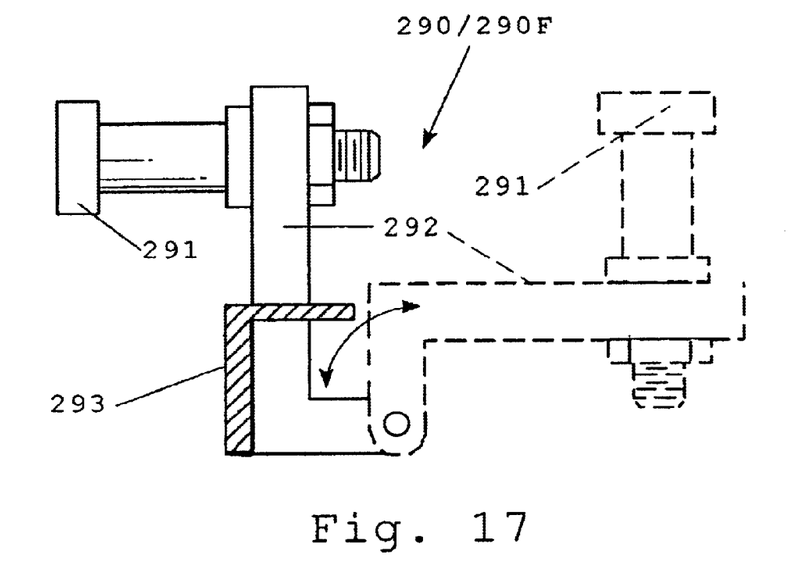
FIG. 17 is a front view of another embodiment of a second component, e.g., another flip up, stow away striker part, of the invention.

In general, the second component 290, which may be considered to be a catch or a striker type, may include one or more of the following parts or features: catch or striker 291 itself; member 292 leading to and/or mounting the catch or striker 291; movable striker restraint member 293; spacing collar 294 to form a stop when a height of a vertically adjustable catch or striker 291 is to be set at a certain adjustment or position (FIG. 10); and threaded, mounted receptacle 296 such as jack bolt (FIGS. 6, 10 and 14) and so forth or the like for mounting certain types of second components 290. The second component 290, as can the first component 190, can take varied forms. Among the many forms which the second component 290 can take the following are noted: O-ring, D-ring, triangular ring, rectangular ring, and so forth and the like type, which may be, for example, of the forwardly folding variety (FIGS. 1, 3, 6–10, 12, 13 and 19–23), vertically adjustable, rearwardly or sidewardly folding varieties (not illustrated), or rigid variety, which may be vertically adjustable, for example, by screwing (FIGS. 15 and 16); a basic inverted J- or L-shaped variety, which may be rigid and of the screw-type for vertical adjustment (FIG. 14) or of the folding post variety (FIGS. 25 and 26); a sidewardly folding frame type (FIG. 17); a hook or catch type (FIG. 18); and the pop up or other nonthreaded vertically adjustable type, including varieties with inverted L-shaped strikers (FIGS. 27 and 37–39) and inverted U-shaped strikers (FIGS. 24, 28–36 and 41). Alternatively, the second component 290 may be provided by a simple receptacle and post or other engaging member subcombination 19, 29, especially, for example, where a moving hook, for example, hooked lever 190H, which may have a cam-endowed member for engagement with the frame engaging member 29, which may be considered to be a stationary member 290S, or the depending hook 192H of a clamp, can engage the member 19 and fasten the first component 190 thereto (FIGS. 5, 43, 44 and 47) which has an advantage that, if it is desired that immovable auxiliary component(s) such as the hook(s) 129 (FIGS. 4 and 46) are to be mounted with the frame 100, only one model or style of receptacle, member subcombination 19, 29/290S may be required for installation to the cargo bed 9.

Figure 42:
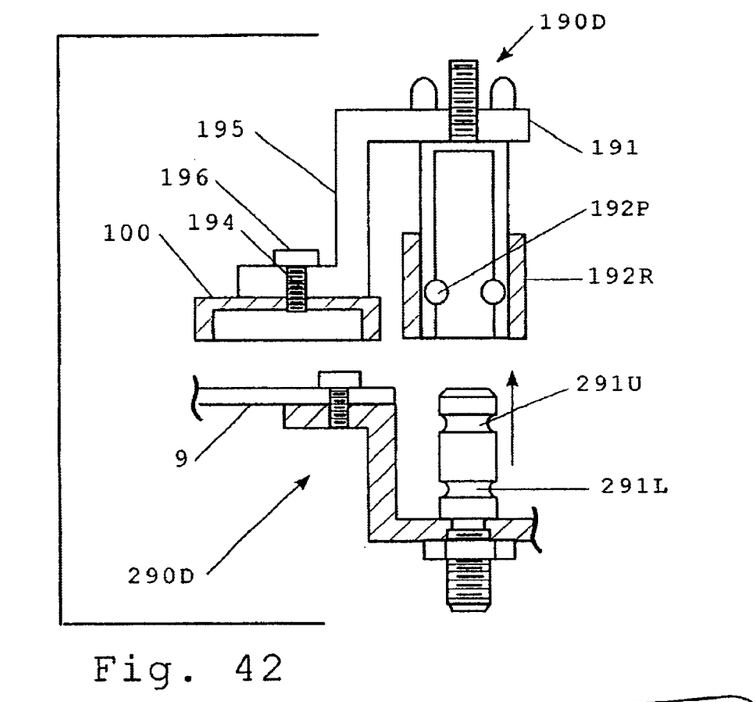
FIG. 42 is a side, sectional view of another embodiment of a second component of the invention, e.g., another pop up type with locking and release pins and a sliding release system mechanism akin to that otherwise employed in industrial pneumatic hoses of the quick-disconnect type, to provide for multiple positions for an attached striker.

In addition to the foregoing, the following describes further particular features of various embodiments shown in the drawings:

| Feature | Comment |
| --- | --- |
| 9C | Cap plug (FIG. 37). |
| 19CS | Clamp spring (FIGS. 19–21). |
| 19D | "Down" stop (FIGS. 38, 39). |
| 19DH | Drain hole (FIGS. 4, 22, 23, 43). |
| 19G | Groove (FIG. 40). |
| 19P | Pin (FIG. 41). |
| 19U | "Up" stop (FIGS. 38, 39). |
| 190C | Clamp, movable first component (FIGS. 18, 43, 44). |
| 190D | Detent, movable first component (FIG. 42). |
| 190L | Actuatable latch, movable first component (FIGS. 1, 2, 6–9, 11). |
| 290D | Detent type second component for securing after raising or lowering the catch or striker 291 itself (FIGS. 24, 34–36, 38, 39, 41, 42). |
| 290F | Foldable type second component catch or striker, frontward/rearward with respect to the catch or striker 291 itself (FIGS. 6–10, 12, 13, 19–23). |
| 290F' | Foldable type second component catch or striker, sideward with respect to the catch or striker 291 itself (FIGS. 17, 25, 26). |
| 290T | Threaded mechanism type second component catch or striker, to raise or lower (FIGS. 14–16, 27–30). |
| 291C | Clearance for striker 291 (FIG. 30). |
| 291G | Groove (FIGS. 24, 34–36). |
| 291L | Lower catch groove (FIGS. 38, 39, 42). |
| 291R | Rotating, semicircular disc for vertical position of striker 291 with a groove 291G (FIGS. 34–36). |
| 291S | Spring (FIGS. 38, 39, 41). |
| 291U | Upper catch groove (FIGS. 38, 39, 42). |
| 292B | Body of lock (FIG. 24). |
| 293B | Bail (FIGS. 30–33). |
| 293F | Fingers to be spread to allow contact outside grooved recess for striker 291 (FIG. 33). |
| 293H | Bail finger hold (FIG. 30). |
| 293S | Bail support, to hold U-bolt in "up" position (FIGS. 30–33). |
| 293SB | Bail side, swings down to allow access of latch to striker 291. |

Conclusion

The present invention is thus provided. Various features, parts, subcombinations and combinations may be employed with or without reference to other features, parts, subcombinations or combinations in the practice of the invention, and numerous and sundry adaptations and modifications can be effected within its spirit, the literal claim scope of which is particularly pointed out as follows:

We claim:

1. A quick-installing and quick-releasing pull out cargo-carrying frame comprising a stationary frame to which is attached a first component of a quick-install, quick-release attachment member, which can be employed to secure the stationary frame to a cargo or other mounting area of a vehicle, trailer or other suitable mounting member through a second component of the quick-install, quick-release attachment member corresponding to said first component, wherein said first component is selected from the group consisting of an actuatable, single rotor latch and an over-center toggle locking action pull-action manual clamp.

2. The cargo-carrying frame of claim 1, which further comprises a movable frame attached to said stationary frame.

3. The cargo-carrying frame of claim 2, which further comprises a tray or other cargo-supporting member attached to said movable frame.

4. In combination, the cargo-carrying frame of claim 1, and, attached thereto, a vehicle, trailer or other suitable mounting member having said second component.

5. In combination, the cargo-carrying frame of claim 3, and, attached thereto, a vehicle, trailer or other suitable mounting member having said second component.

6. A vehicle, trailer or another artifice having a suitable mounting member, to or in which is mounted a second component of a quick-install, quick-release attachment member, corresponding to a first component of the quick-install, quick-release attachment member for a quick-installing and quick-releasing pull out cargo-carrying frame including a stationary frame to which said first component is attached, which can be employed to secure the frame to a cargo or other mounting area of the vehicle, trailer or other suitable mounting member through said second component.

7. A quick-installing and quick-releasing pull out cargo-carrying frame comprising a stationary frame to which is attached a first component of a quick-install, quick-release attachment member, which can be employed to secure the stationary frame to a cargo or other mounting area of a vehicle, trailer or other suitable mounting member through a second component of the quick-install, quick-release attachment member corresponding to said first component, wherein at least one of the following is included:

the first component is selected from the group consisting of an actuatable, single rotor latch and an over-center toggle locking action pull-action manual clamp; and the second component is selected from the group consisting of an immovable post-type catch and a folding striker.

8. The cargo-carrying frame of claim 7, wherein the first component is the latch.

9. The cargo-carrying frame of claim 7, wherein the first component is the clamp.

10. In combination, the cargo-carrying frame of claim 7, and, attached thereto, a vehicle, trailer or other suitable mounting member having the second component, wherein the second component is the immovable post-type catch that is mounted in a receptacle in the vehicle, trailer or other suitable mounting member.

11. In combination, the cargo-carrying frame of claim 8, and, attached thereto, a vehicle, trailer or other suitable mounting member having the second component, wherein the second component is the immovable post-type catch that is mounted in a receptacle in the vehicle, trailer or other suitable mounting member.

12. In combination, the cargo-carrying frame of claim 9, and, attached thereto, a vehicle, trailer or other suitable mounting member having the second component, wherein the second component is the immovable post-type catch that is mounted in a receptacle in the vehicle, trailer or other suitable mounting member.

13. In combination, the cargo-carrying frame of claim 7, and, attached thereto, a vehicle, trailer or other suitable mounting member having the second component, wherein the second component is the folding striker that is mounted to the vehicle, trailer or other suitable mounting member.

14. In combination, the cargo-carrying frame of claim 8, and, attached thereto, a vehicle, trailer or other suitable mounting member having the second component, wherein the second component is the folding striker that is mounted to the vehicle, trailer or other suitable mounting member.

15. In combination, the cargo-carrying frame of claim 9, and, attached thereto, a vehicle, trailer or other suitable mounting member having the second component, wherein the second component is the folding striker that is mounted to the vehicle, trailer or other suitable mounting member.

16. The combination of claim 13, wherein the folding striker has a generally L-shaped frame, which defines an apex and two legs, and which can pivot around an axis about the apex; two catches projecting generally orthogonally from the legs and generally parallel with the pivot axis, a first catch of which is on a first of the two legs and can catch the first component, and a second catch of which is on a second of the two legs; and at least one catch-receiving clamp, one of which can receive the second catch.

17. The combination of claim 14, wherein the folding striker has a generally L-shaped frame, which defines an apex and two legs, and which can pivot around an axis about the apex; two catches projecting generally orthogonally from the legs and generally parallel with the pivot axis, a first catch of which is on a first of the two legs and can catch the first component, and a second catch of which is on a second of the two legs; and at least one catch-receiving clamp, one of which can receive the second catch.

18. The combination of claim 15, wherein the folding striker has a generally L-shaped frame, which defines an apex and two legs, and which can pivot around an axis about the apex; two catches projecting generally orthogonally from the legs and generally parallel with the pivot axis, a first catch of which is on a first of the two legs and can catch the first component, and a second catch of which is on a second of the two legs; and at least one catch-receiving clamp, one of which can receive the second catch.

* * * * *